Patented Oct. 8, 1935

2,016,892

UNITED STATES PATENT OFFICE 2,016,892

COMPOSITION OF MATTER

George W. Clarvoe, Somerville, N. J., assignor to Johns-Manville Corporation, New York, N. Y., a corporation of New York No Drawing. Application March 9, 1933, Serial No. 660,093

12 Claims. (Cl. 51—280)

This invention relates to a composition of matter and particularly to one containing finely divided solid material and an anticaking agent adapted to prevent the formation of the solid material into a hard cake when allowed to remain in contact with a liquid, as, for example, in an aqueous polishing composition.

The invention comprises a composition including the following: a liquid that is suitably aqueous; finely divided solid material, preferably diatomaceous earth, adapted, when settled alone from a suspension in the liquid, to adhere together or become compacted in the form of a relatively hard cake; and an anticaking agent of type described below, to minimize the tendency to formation of such a cake. The anticaking agent may be a compound that, in the said liquid, gives electropositive units adsorbable by the finely divided solid; it may be an electrolyte, such as ammonium chloride, calcium nitrate, and/or aluminum chloride. The composition may include also other, conventional ingredients. Thus, a polishing composition may comprise not only water, finely divided diatomaceous earth, and an anticaking agent, but also other ingredients that are usual in polishes, as, for example, an oil, glycerin, and other emulsification agents or detergents. Likewise, a varnish may comprise the diatomaceous earth, an anticaking agent, a drying oil, a resin, and a vehicle.

The form of diatomaceous earth used may be one containing an appreciable proportion of a substance that has the property of being rendered adhesive by water. The said substance may be at least appreciably soluble in water, as, for example, hydrous silicic acid or an alkali metal silicate, and is intimately associated with the diatomaceous earth. Finely divided diatomaceous earth that is particularly satisfactory for the purpose of the present invention is made by milling dry diatomaceous earth, suspending the resulting milled material in an air stream, passing the stream through a series of cyclones, to deposit most of the suspended material, and then separating the fraction of extremely fine particles remaining in suspension, by passing the suspension issuing from the series of cyclones to a so-called bag house or stocking dust collector. Here the fine particles are recovered as the air stream passes through a woven fabric. This fraction or air-separated material is of average particle size that is quite small, as, for example, less than 2 microns, as measured by the Oden sedimentation test. In aqueous compositions it is electronegative. It has sufficient abrasive action for use in many polishing compositions and, on the other hand, is of minimum tendency to cause scratching. But such a finely divided material, when used in a paste such as an aqueous polish, becomes compacted together; or, when used in a thin suspension, it may settle to form a relatively hard cake or compact mass that is not readily redistributable throughout the liquid, as by hand stirring.

I have now discovered means for minimizing this tendency to caking or compacting to an undesirable extent. Briefly stated, the newly discovered means comprises associating with solid material, such as diatomaceous earth of the kind described, an anticaking agent, particularly an electrolyte of type described below, adapted to flocculate a suspension of diatomaceous earth in a liquid of the type of water or an aqueous emulsion.

The electrolyte should be one that is appreciably ionized and soluble in water or in the liquid medium in which the finely divided solid is dispersed and adapted to minimize the hard caking of the solid, as by modifying the charge thereupon, due to the preferential adsorption of positive units or ions, by causing incipient flocculation of the solid particles, and/or by minimizing the effect of the liquid upon the adhesive substance associated with or formed from the solid. For best results, the electrolyte should not be a hydroxide of an alkali metal or of a monovalent radical, such as ammonium. Also it should not be a free acid. Electrolytes that are particularly suitable for this purpose are salts of the multivalent metals, as, for example, aluminum or calcium, and also ammonium chloride. There have been used to particular advantage aluminum chloride or sulfate, calcium nitrate or chloride, and ammonium chloride.

These electrolytes are effective and desirable when the composition in which the diatomaceous earth is contained comprises an appreciable proportion of water, preferably a large proportion, or other water-soluble ingredient or hydroxy-compound, such as alcohol, adapted, on the one hand, to cause appreciable solution and ionization of the electrolytes and, on the other hand, to cause hard caking of the diatomaceous earth if used in the absence of an anticaking agent.

An improved polishing composition made in accordance with the present invention comprises air-separated diatomaceous earth, an anticaking agent, an emulsion of oil and water, and, if desired, suitable other ingredients in relatively small proportions. A polish adapted for use on lacquered automobiles is illustrated by the following specific example:

| Ingredient | Parts by weight | |
|---|---|---|
| | Range | Typical proportion |
| Finely divided diatomaceous earth | 8 –14 | 12.8 |
| High boiling fraction of refined petroleum of specific gravity of approximately 39–40° Bé. (mineral seal oil) | 15 –25 | 17.0 |
| Glycerin | 2 – 5 | 4.0 |
| Gum tragacanth | 0.01– 0.20 | 0.15 |
| Sulphonated oil emulsification agent (such as Twitchell's base II) | 0.1 – 0.5 | 0.15 |
| Formalin | 0.05– 0.4 | 0.08 |
| Amyl acetate | 0.2 – 1.0 | 0.50 |
| Ammonium chloride (anticaking agent) | 0.05– 0.2 | 0.10 |
| Water | | To make total 100 parts. |

It will be understood that an ingredient may be omitted if its function in the finished product is not desired and also that the ingredient may be replaced by other material adapted to serve the same function.

The glycerin serves as a surface tension lowering medium. Another such material that may be used is trisodium phosphate or glycol.

Gum tragacanth and the sulphonated oil serve as emulsification agents. Gelatin (glue), wheat flour, and/or sulphonated castor oil (Turkey red oil) may be used for the purpose.

Formalin serves to preserve the gum tragacanth.

The amyl acetate is representative of the class of lacquer solvents, including butyl acetate, for example, and is used partly to increase the cutting action of the polish upon the lacquer surface that is being polished.

Water is the vehicle in which the other ingredients are suspended or made into a composition such as a paste or fluid emulsion.

The mineral seal oil assists in cleaning and imparting lustre to the surface being polished.

A specific example illustrating a lacquer made in accordance with the present invention follows. A lacquer is made with conventional ingredients including pyroxylin and/or a resin and a solvent mixture therefor containing a water-soluble ingredient, as, for example, aqueous alcohol, isopropyl alcohol, or ethyl lactate, very finely divided diatomaceous earth containing an appreciable proportion of sodium silicate integrally united to the particles of diatomaceous earth and made as described below, and an anticaking agent of the type described, suitably calcium nitrate or calcium chloride.

In selecting the anticaking agent, consideration should be given to the pH value desired in the finished composition. Aluminum chloride gives a pH value that is low, in other words a relatively high acidity that is unsatisfactory for many purposes. Calcium salts, such as the nitrate, that are soluble in water or in the water-soluble ingredient of the solvent mixture are preferred in lacquer. In aqueous polishing compositions, ammonium chloride serves to minimize the caking of the finely divided solid material, such as diatomaceous earth of the type described, and also provides a pH value that is near the optimum.

The fineness and type of diatomaceous earth to be used may be varied with the use to which the composition is to be put. Thus, for polishing compositions of greater abrasiveness than those described above, there may be used diatomaceous earth of filtration grade suitably freed from grit and coarse particles, as by being suspended in milled condition in an air stream and settled, to remove the grit, and then, in a separate receiver, such as a series of cyclones, caused to deposit grit-free material for use in the polish composition.

Also, the diatomaceous earth may be one that has been calcined as described in U. S. Patent 1,477,394, issued to Thatcher on December 11, 1923, or calcined in the presence of a flux as described in U. S. Patent 1,502,547, issued to Calvert, Dern, and Alles on July 22, 1924. The calcined material may be air-separated to give a fine fraction particularly suitable for use and showing more than 50 per cent by weight of particles of size smaller than 4 microns, as measured by the Oden sedimentation test.

The product made by calcination in the presence of a flux contains a substantial proportion of a silicate compound, such as sodium silicate or the like, integrally united to the particles of diatomaceous earth and adapted to be rendered adhesive by water.

Unless the particularly desirable properties of diatomaceous earth are desired, there may be used, in place of it, another very finely divided solid, as, for example, finely ground quartz, tripoli, or feldspar.

The details that have been given are for the purpose of illustration and not restriction, and many variations therefrom may be made within the scope of the appended claims.

What I claim is:

1. A polishing composition comprising a substantial proportion of a liquid suspending medium, finely divided diatomaceous earth suspended in the said medium, and a small proportion of an admixed anticaking agent selected from a group consisting of aluminum chloride, aluminum sulfate, calcium nitrate, calcium chloride, and ammonium chloride.

2. A polishing composition comprising a substantial proportion of a liquid suspending medium, finely divided diatomaceous earth suspended in the said medium, and a small proportion of an admixed anticaking agent selected from a group consisting of aluminum chloride, aluminum sulphate, calcium nitrate, calcium chloride, and ammonium chloride, the said diatomaceous earth being of average size of particles less than 2 microns.

3. A polishing composition comprising an intimate mixture of water, finely divided diatomaceous earth, an oily ingredient adapted to assist in imparting lustre to the surface to be polished, a surface tension lowering and emulsifying agent, a cutting agent adapted to exercise appreciable solvent power on the surface to be polished, and an anticaking agent.

4. A polishing composition comprising a liquid containing a substantial proportion of water, a finely divided siliceous material adapted to form a relatively compact mass in the said liquid, and an admixed anticaking agent including calcium nitrate.

5. A polishing composition comprising a liquid including a substantial proportion of water, finely divided diatomaceous earth including an appreciable proportion of a silicate compound as an integral constituent of the said earth and adapted to be rendered adhesive by water, and an admixed anticaking agent including a compound of a metal adapted to minimize the effect of water upon the silicate compound.

6. A polishing composition comprising a liquid including a substantial proportion of water, finely divided diatomaceous earth including an appreciably soluble silicate compound as an integral constituent of the said earth, and an admixed anticaking agent including a salt of a multivalent metal adapted to minimize the effect of water upon the silicate.

7. A polishing composition comprising a liquid including a substantial proportion of water, finely divided diatomaceous earth, an appreciable proportion of a water-soluble silicate compound as an integral constituent of the said earth, and an anticaking agent including calcium nitrate.

8. A polishing composition comprising a liquid including a substantial proportion of water, finely divided diatomaceous earth, an appreciable proportion of a water-soluble silicate compound as an integral constituent of the said earth, and an anticaking agent including ammonium chloride.

9. A polishing composition comprising a liquid including a substantial proportion of water, finely divided diatomaceous earth, an appreciable proportion of a water-soluble silicate compound as an integral constituent of the said earth, and an anticaking agent including a compound that, in the said liquid, provides electropositive units.

10. A polishing composition comprising water, diatomaceous earth including an appreciable proportion of hydrous silicic acid as an integral constituent of the said earth, and an anticaking agent.

11. A polishing composition comprising water, diatomaceous earth including an appreciable proportion of hydrous silicic acid as an integral constituent of the said earth, the said diatomaceous earth being of average size of particles less than 2 microns, and an anticaking agent comprising an electrolyte.

12. A polishing composition comprising water, diatomaceous earth including an appreciably soluble silicate compound as an integral constituent of the said earth and an anticaking agent comprising a compound adapted to give electropositive units in water, the said diatomaceous earth having an average size of particles less than 4 microns.

GEORGE W. CLARVOE.